(12) United States Patent
Cvancara

(10) Patent No.: US 6,414,813 B2
(45) Date of Patent: Jul. 2, 2002

(54) ROTATIONAL ACCELERATION CORRECTION IN A DISC DRIVE

(75) Inventor: Dustin M. Cvancara, St. Paul, MN (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/770,422

(22) Filed: Jan. 26, 2001

Related U.S. Application Data

(63) Continuation of application No. PCT/US01/02677, filed on Jan. 26, 2001.
(60) Provisional application No. 60/180,755, filed on Feb. 7, 2000.

(51) Int. Cl.[7] .............................................. G11B 5/596
(52) U.S. Cl. ..................... 360/77.02; 360/75; 360/77.03
(58) Field of Search ............................ 360/75, 77.02, 360/77.03, 77.04, 31

(56) References Cited

U.S. PATENT DOCUMENTS

| | | | |
|---|---|---|---|
| 5,389,850 A | 2/1995 | Wilmer | 310/329 |
| 5,426,545 A * | 6/1995 | Sidman et al. | 360/78.09 X |
| 5,491,394 A | 2/1996 | Harwood et al. | 318/563 |
| 5,521,772 A | 5/1996 | Lee et al. | 360/75 |
| 5,663,847 A | 9/1997 | Abromovitch | 360/77.02 |
| 5,696,645 A | 12/1997 | Laughlin | 360/75 |
| 5,856,895 A | 1/1999 | Schnaenzer et al. | 360/103 |
| 5,923,487 A | 7/1999 | Carlson et al. | 360/60 |
| 5,936,787 A | 8/1999 | Ohmi | 360/73.03 |
| 6,018,431 A | 1/2000 | Carlson et al. | 360/60 |
| 6,046,878 A * | 4/2000 | Liu et al. | 360/77.02 X |
| 6,064,540 A * | 5/2000 | Huang et al. | 360/77.03 X |

FOREIGN PATENT DOCUMENTS

EP   0 572 789 A2   12/1993

\* cited by examiner

*Primary Examiner*—Andrew L. Sniezek
(74) *Attorney, Agent, or Firm*—Westman, Champlin & Kelly, P.A.

(57) ABSTRACT

A disc drive controller corrects for rotational vibration disturbances of a head position. The controller includes multiple sets of adjustable controller gains. The controller compares an accelerometer output to an acceleration threshold and generates conditional branches as a function of the comparison. The controller updates one set of the adjustable controller gains within a computational time limit after a first conditional branching. The controller updates a second set of the adjustable controller gains within the computational time limit after a second conditional branching.

16 Claims, 5 Drawing Sheets

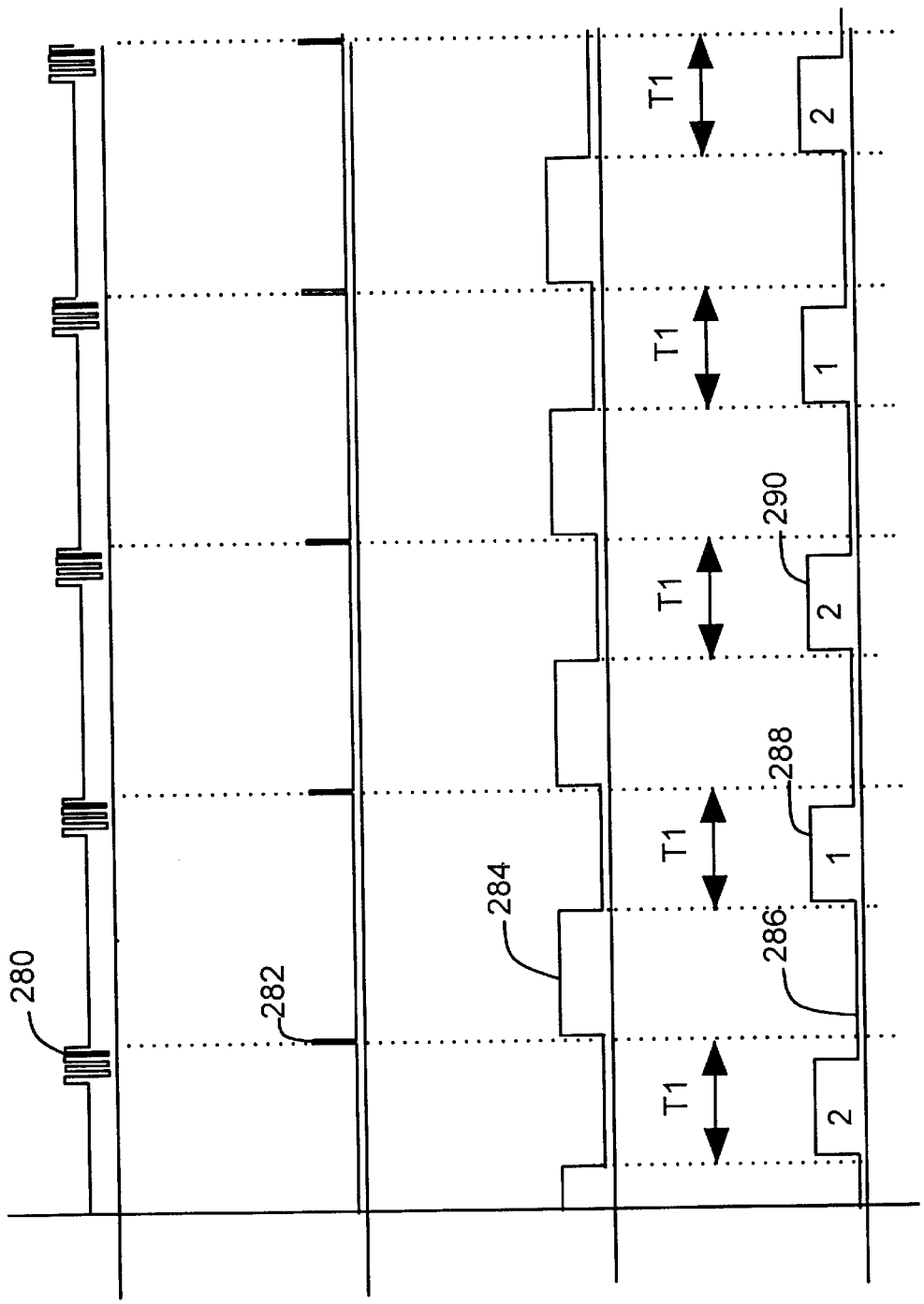

ROTATIONAL ACCELERATION CORRECTION IN A DISC DRIVE

CROSS REFERENCE TO RELATED APPLICATION

This application claims priority of U.S. Provisional Application No. 60/180,755, filed Feb. 7, 2000 by Dustin M. Cvancara for "Improved Calibration of Filtered X-Gains with respect to Computational Time Limitations and the Rejection of Transient Events"; this application is also a continuation of International Application No. PCT/US01/02677, filed on even date Jan. 26, 2001 herewith by Seagate Technology LLC for "Rotational Acceleration Correction in a Disc Drive", and to be published in English, which in turn claims priority of the aforementioned U.S. Provisional Application.

FIELD OF THE INVENTION

The invention relates to disc drive storage systems using accelerometers. In particular, the invention relates to correction for rotational acceleration in a disc drive storage system.

BACKGROUND OF THE INVENTION

Disc drives have problems when rotational shock or vibration forces are applied. The rotational shock can move a read/write head away from the center of the desired track on a disc. This can cause either an error or a delay in transferring data. The use of an accelerometer for correction, however, reduces problems encountered with rotational vibration.

The use of accelerometers in disc drives is known. In U.S. Pat. Nos. 6,018,431 & 5,923,487 Carlson et al., for example, a disc drive includes a shock evaluator or sensing circuit with resettable threshold shock values to account for changes in operating conditions. In U.S. Pat. No. 5,663,847 Abramovitch, a disc drive includes an acceleration responsive sensor that is sampled at a different sampling rate than the position error signal.

It is difficult, however, for the head-positioning servo controller to complete computations associated with using an accelerometer without excessively delaying computations associated with responding to servo positioning command inputs from an associated computer system. Further, when the disc drive experiences rather large transient rotational shocks, the vibration correction calculations can tend to overcorrect and cause significant errors in the performance of the servo controller functions.

Disc drives, particularly those used in battery-powered portable computers, have significant electrical power constraints that preclude solving these problems using larger or faster controllers that draw excessive amounts of power.

A method and an apparatus are needed, within the power constraints of a disc drive, to correct for rotational vibration while avoiding unduly delaying performance of servo control calculations. A method and apparatus are also needed that avoid overcorrecting for transient rotational events.

SUMMARY OF THE INVENTION

Disclosed is a method and circuit that correct for rotational vibration disturbances of a head position in a disc drive. The circuit includes a servo controller that controls a positioning motor for the head as a function of servo data from the head. The circuit also includes a rotational vibration (RV) controller that also controls the positioning motor for the head as a function of an output of an accelerometer and multiple sets of adjustable gains "$g_i$" in the rotational vibration controller.

The accelerometer output indicates vibration and is coupled to the RV controller. The accelerometer output is compared to an acceleration threshold stored in the controller. If the acceleration is greater than the threshold, then a conditional branch is made to provide rotational vibrational correction to the positioning motor.

The controller updates one set of the adjustable controller gains "$g_i$" within a computational time limit after a first execution of servo controller code. The controller preferably updates a second set of the adjustable controller gains "$g_i$" within the computational time limit after a second execution of servo controller code.

Additional features and benefits will become apparent with a careful review of the following drawings and the corresponding detailed description.

BRIEF DESCRIPTION OF THE DRAWINGS

FIG. 5 illustrates exemplary timing of gain corrections interleaved with servo calculations in a processor.

DETAILED DESCRIPTION OF THE ILLUSTRATED EMBODIMENTS

Figure 1:
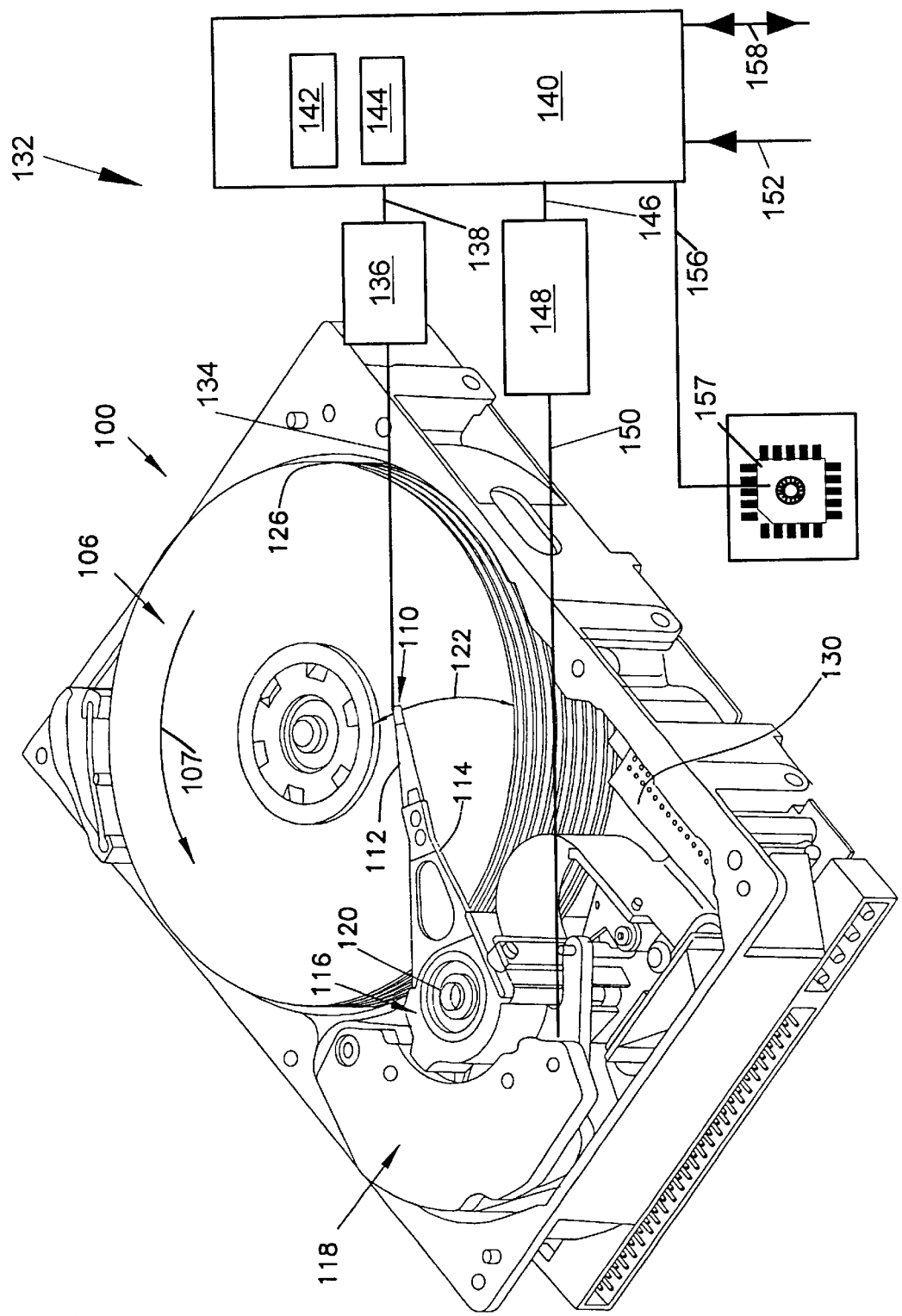
FIG. 1 illustrates an embodiment of a disc drive including a processor adapted to perform rotational acceleration correction.

In FIG. 1, an embodiment of a disc drive 100 includes a processor 140 that performs rotational acceleration correction as a function of an accelerometer output 156 from an accelerometer 157. Disc drive 100 includes a disc pack 126 having storage surfaces 106 that are typically layers of magnetic material. The disc pack 126 includes a stack of multiple discs. A read/write head assembly 112 includes a read/write transducer 110 for each stacked disc. Disc pack 126 is spun or rotated as shown by arrow 107 to allow read/write head assembly 1 12 to access different rotational locations for data on the storage surfaces 106 on the disc pack 126.

Read/write head assembly 112 is actuated to move radially, relative to the disc pack 126, as shown by arrow 122 to access different radial locations for data on the storage surfaces 106 of disc pack 126. Typically, the actuation of read/write head assembly 112 is provided by a voice coil motor 118. Voice coil motor 118 includes a rotor 116 that pivots on axle 120 and an arm 114 that actuates the read/write head assembly 112.

Accelerometer 157 is preferably mounted in disc drive 100. Accelerometer 157 is closely mechanically coupled to the disc drive 100 so that it experiences substantially the same acceleration as the disc drive 100. Alternatively, accelerometer 157 can be mounted external to the disc drive 100, provided that the close mechanical coupling is maintained. Accelerometer 157 is oriented such that accelerometer 157 experiences rotational acceleration that is similar to the rotational acceleration experienced by disc drive 100 due to rotational acceleration of the disc drive 100. Accelerometer 157 provides acceleration data that is used by a circuit at location 130 in controlling the position of read/write transducer 110.

A portion 132 of the circuit at location 130 that controls the rotational actuation of the read/write head assembly 112 is broken out and illustrated schematically on the right side of FIG. 1. One or more of the read/write transducers 110 provide data indicating a sensed actuator position 2 (track) on line 134 to a demodulator 136. Demodulator 136 demodulates the sensed actuator position 2, putting the position data in a digital form that is coupled along line 138 to processor 140. Processor 140 includes RAM 142 and ROM 144 and generates a signal on line 146 for controlling the voice coil motor 118. The signal on line 146 is amplified by power amplifier 148. Power amplifier 148 provides an output current I that couples along line 150 to the voice coil motor 118 and controls the rotational or mechanical position $2_M$ of read/write head assembly 112. The current I includes a correction current as explained in more detail below in connection with the example illustrated in FIG. 2. Processor 140 includes a setpoint input 152 that receives reference data, typically from a CPU of an associated personal computer, indicating a desired actuator position $2_d$. ROM 144 stores instructions for a voice coil motor controller process or algorithm that controls the read/write head position $2_M$ so that data can be read or written on the desired (setpoint) track on the storage surfaces 106 of disc pack 126.

The processor 140 includes instructions stored in ROM 144 for a process or algorithm that provides acceleration correction for the read/write head assembly 112 using the accelerometer 157. The processor 140 provides an output on line 146 that is corrected for the effects of rotational acceleration sensed by the accelerometer 157. The rotational acceleration correction is described in more detail below in connection with examples illustrated in FIGS. 2–5. The function of processor 140 under normal or natural operating conditions is to provide closed loop "servo" control of the positioning of the voice coil motor 118 so that data on the disc pack 126 can be read or written. The processor 140 can also perform a servo filtered-X algorithm for rotational acceleration corrections when needed without interrupting the normal servo functions for excessively long time intervals. The filtered X algorithm calibrates a set of gains based on the amplitude and phase relationship between the acceleration and the position error signal (PES) experienced by the servo system. The rotational acceleration correction can be performed automatically when the levels of acceleration and/or a position error signal (PES) are above thresholds where such correction is indicated.

It will be understood by those skilled in the art that the processor 140 can execute other support functions for the disc drive 100 as well. Portion 132 of the disc drive controller can be implemented as a single integrated circuit or it can be implemented in several integrated circuits or include discrete circuit components or software in any combination, depending on the application. Portion 132 of the disc drive controller can transmit and receive data for the user on line 158, or data for the user can be handled by a different portion of the disc drive circuitry, depending on the needs of the application.

Figure 2:
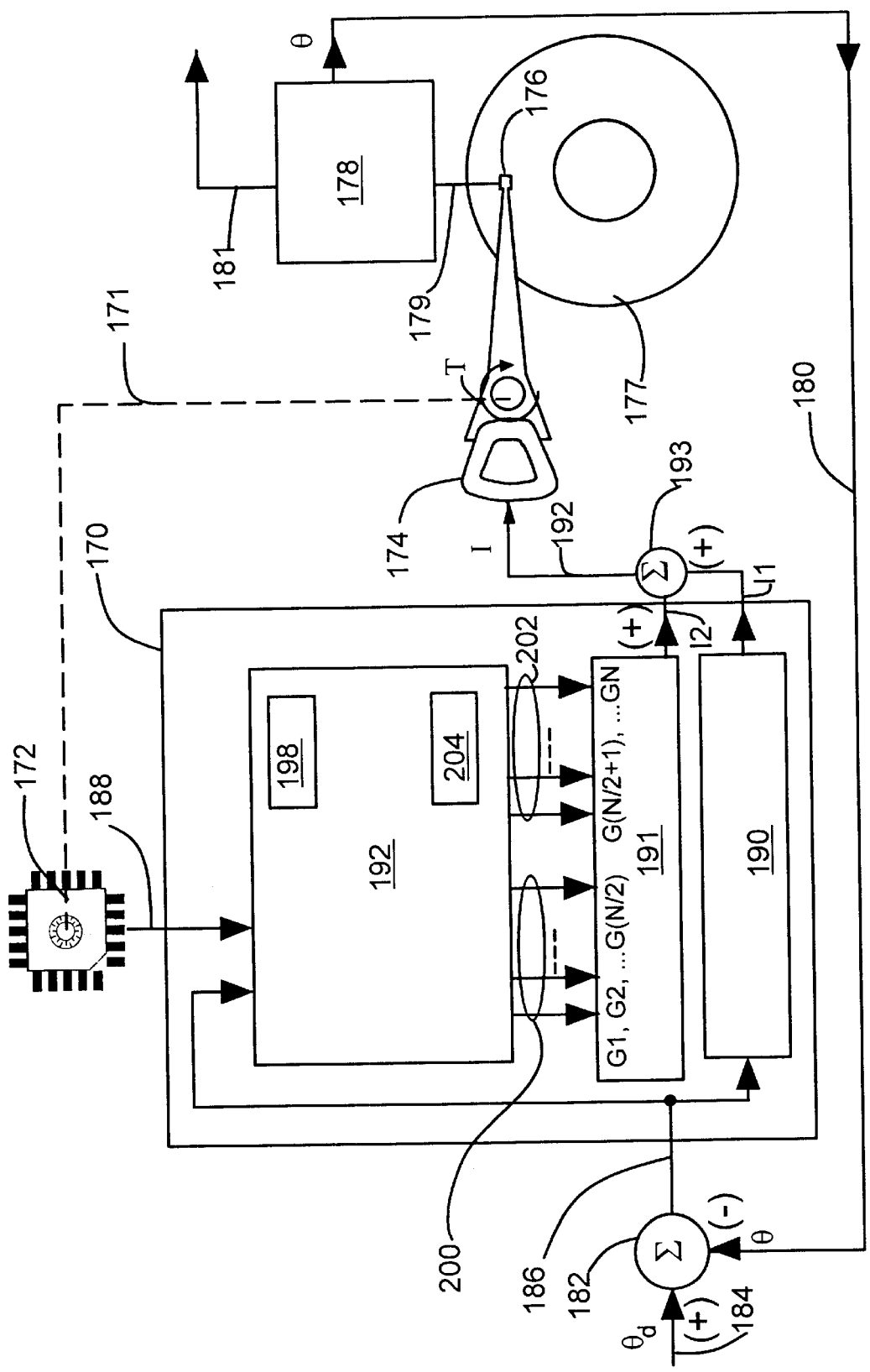
FIG. 2 illustrates a block diagram of an embodiment of a disc drive including a processor adapted to perform rotational acceleration correction.

FIG. 2 illustrates a first embodiment of a disc drive controller 170 using an accelerometer 172 to provide rotational vibration feedforward (RVFF) control. This RVFF control corrects for vibration disturbances of the position of a read/write head 176 on a storage disc 177. As illustrated by broken line 171, the accelerometer 172 is mechanically coupled to the disc drive and experiences substantially the same vibrational disturbances that are experienced by read/write head 176 and positioning motor 174.

Controller 170 includes a servo controller 190 that provides a current I1 to summing junction 193. Controller 170 also includes a rotational vibration feedforward (RVFF) controller 191 that provides a current I2 to summing junction 193. Summing junction 193 provides a current I1+I2 along line 192 to a positioning motor 174 which positions the read/write head 176 on the surface of storage disc 177.

The read/write head 176 senses its position or track on the magnetic storage disc 177. Read/write head 176 electrically couples along line 179 to a demodulator circuit 178. Demodulator circuit 178 demodulates the sensed position and provides a demodulated output indicating a sensed read/write head position θ on line 180. Demodulator circuit 178 also provides data read from the disc 177 along line 181 to a computer system connected to the disc drive. The sensed read/write head position θ on line 180 is coupled to a summing junction 182. The summing junction 182 also receives a signal indicating a desired head position $θ_d$ on line 184 from a computer system connected to the disc drive. The summing junction 182 generates a position error signal (PES) 186 that represents the algebraic difference ($θ_d$–θ). The servo controller 190, the read/write head 176, and the positioning motor 174 together comprise a servo system, which is a closed-loop control system that controls the position of the read/write head 176.

The rotational vibration (RV) controller 191 has multiple sets 200, 202 of adjustable controller gains "$g_i$", i.e. G1, G2 . . . GN. A "set" of controller gains comprises one or more gains. The controller gains "$g_i$" are adjusted to change the characteristics of the RV controller 191 as needed to provide for correction (current I2) when there is rotational acceleration. An RV update circuit 192 performs calculations for rotational acceleration correction in real time. In other words, RV update circuit 192 performs calculations for transient rotational acceleration correction while the transient disturbance is taking place. At the same time, however, servo controller 190 performs servo calculations to position the head 176 with current I1 to the desired rotational position indicated by the input on line 184, which can be time variant. The servo controller 190 and the RV update circuit 192 place simultaneous and conflicting demands for processor time on the processor 170. This conflict is overcome in a workable way by an algorithm that divides or splits up the controller gains or taps "$g_i$" into smaller groups or sets 200, 202 of controller gains "$g_i$" and performing the smaller sets at different times that are spaced apart. Slices of code, or processor instructions, that update the smaller sets 200 are executed in a way that is interleaved in time with execution of slices of code for the servo controller 190. This interleaving of code slices is illustrated in more detail in FIG. 5.

Instead of processing all of the taps during the same time slice, in response to the same acceleration and PES levels, the algorithm performs the update or calibration computation in sets. Fore example, five taps can be calculated in one set during one time slice, and five taps can be calculated in another set during a subsequent time slice. This is somewhat complicated by the fact that there is a desire to calibrate the gain taps on current information and only when the PES and acceleration levels are above the required thresholds. Having a first set calibrated does not necessarily imply that a second set will also be calibrated, however, the calibration sets take place so often that the effects tend to even out and all gains are calibrated successfully.

A conditional branch is executed in code to update a set in update circuit 192. Only one of the sets 200, 202 of controller gains "$g_i$" is updated with each conditional branch. This spreads out the time used for calculating updated controller gains so that it does not preempt or interrupt the calculations of servo controller 190 for too long a period of time. The calculation of controller gains "$g_i$" by update circuit 192 is broken up into smaller sets 200, 202 that are interleaved in time with the calculations of servo controller 190. Both types of calculations are thus completed in real time without interfering with one another.

The accelerometer 172 provides an accelerometer output 188 that indicates rotational vibration to RV update circuit 192. The accelerometer 172 senses acceleration about a Z-axis that is approximately parallel with an axis of rotation of the read/write head 176. The RV update circuit 192 compares the accelerometer output 188 to an acceleration threshold stored in the controller at memory 198. The RV update circuit 192 also compares the position error signal (PES) on line 186 to a PES threshold stored in the controller at memory 198. If the accelerometer output 188 exceeds the acceleration threshold at 198 and the PES on line 186 exceeds the PES threshold at memory 198, then RV update circuit executes a conditional branch. The slice of code executed in the conditional branch generates an update of one of the sets 200 or 202 of controller gains. This is explained in more detail in FIGS. 3–4.

The update circuit 192 updates one set 200 of the adjustable controller gains "$g_i$" within a computational time limit after a first conditional branch. After a second or subsequent conditional branch, the update circuit updates the second set 202 of adjustable controller gains. In this example, two sets of controller gains are illustrated. It will be understood by those skilled in the art, however, that 3, 4, 5, or an arbitrary number M of sets could be used to meet the computational time limit needs in a particular disc drive application.

Controller 170 generates currents I1 and I2 that are summed at summing junction 193 to form current I that is coupled to voice coil motor 174. Current I includes a current component I1 that due to servo control and also includes a correction current component I2 that corrects for rotational vibration. Voice coil motor 174 provides a torque T that positions the read/write head 176 according to both current components. The read/write head 176 stays well centered on the desired track and data can be read and written on the storage disc 177 without excessive error or delay due to transient rotational acceleration disturbances.

RV update circuit 192 preferably stores a preset gain step limit at 204 The RV update circuit 192 limits adjustable controller gain change "$g_i-g_{i-1}$" by the preset gain step limit. This gain step limit avoids overcorrecting for large rotational accelerations and avoids errors in the position of the read/write head 176 during and after these large rotational accelerations. The controller is thus able to reject the undesired effects of large rotational shocks or other transient noise events.

Update circuit 192 preferably updates the adjustable controller gains "$g_i$" based on amplitude and phase relationships between the accelerometer output 188 and the PES on line 186. In one preferred arrangement, the adjustable controller gains "$g_i$" are updated substantially according to Equation 1.

$$g_i(k)=g_i(k-1)+\text{const}*PES(k)*H_1(k,i) \qquad \text{Equation 1}$$

In Equation 1, k is a sequence number of the conditional branch. A conditional branch may occur frequently when there is lot vibration, or may occur very infrequently when there is little or no vibration. "Const" is a constant and $H_1$ is a function representing the acceleration output 188 passed through a model (algorithm) representing characteristics of the positioning motor 174. Equation 1 is executed once per tap "i" of the filtered X algorithm. The tap "i" is one of the numbered gains in a set. When a larger number of taps is used, the overall feedforward system generally operates better. An increased number of taps, however, increases calculation time. If sets of gains are used, the calculation time at each conditional branch is reduced, and the rate of gain convergence is only slightly reduced using Equation 1. The slowing of the rate of gain convergence is beneficial since it helps limit the effects of transient noise or one-time shock inputs. Equation 1 is explained in more detail below in connection with the flow chart illustrated in FIG. 3.

In another preferred arrangement, adjustable controller gains "$g_i$" are updated substantially according to Equation 2.

$$g_i(k)=g_i(k-1)+F\{\text{const}*PES(k)*H_1(k,i), \text{gain\_step}_{13}\text{limit}\} \qquad \text{Equation 2}$$

In Equation 2, k is a sequence number of the conditional branch, const is a constant, $H_1$ is the acceleration output passed through a model (algorithm) representing characteristics of the positioning motor and $\text{gain}_{13}\text{ step}_{13}\text{limit}$ is a gain step limit stored in the controller. Equation 2 provides the added benefit of limiting the difference in gain calibration levels between different sets of gains. F is a function whose value is equal in amplitude to that of gain step_limit and has the same polarity as the computed product. In this way, the maximum single step change in the individual gains is limited to a positive or a negative $\text{gain}_{13}\text{ step}_{13}$ limit. This provides rejection of spurious inputs and also limits the rate of reaction to sudden changes in vibration characteristics such as amplitude and frequency content. Equation 2 is explained in more detail below in connection with the flow chart illustrated in FIG. 4.

Figure 3:
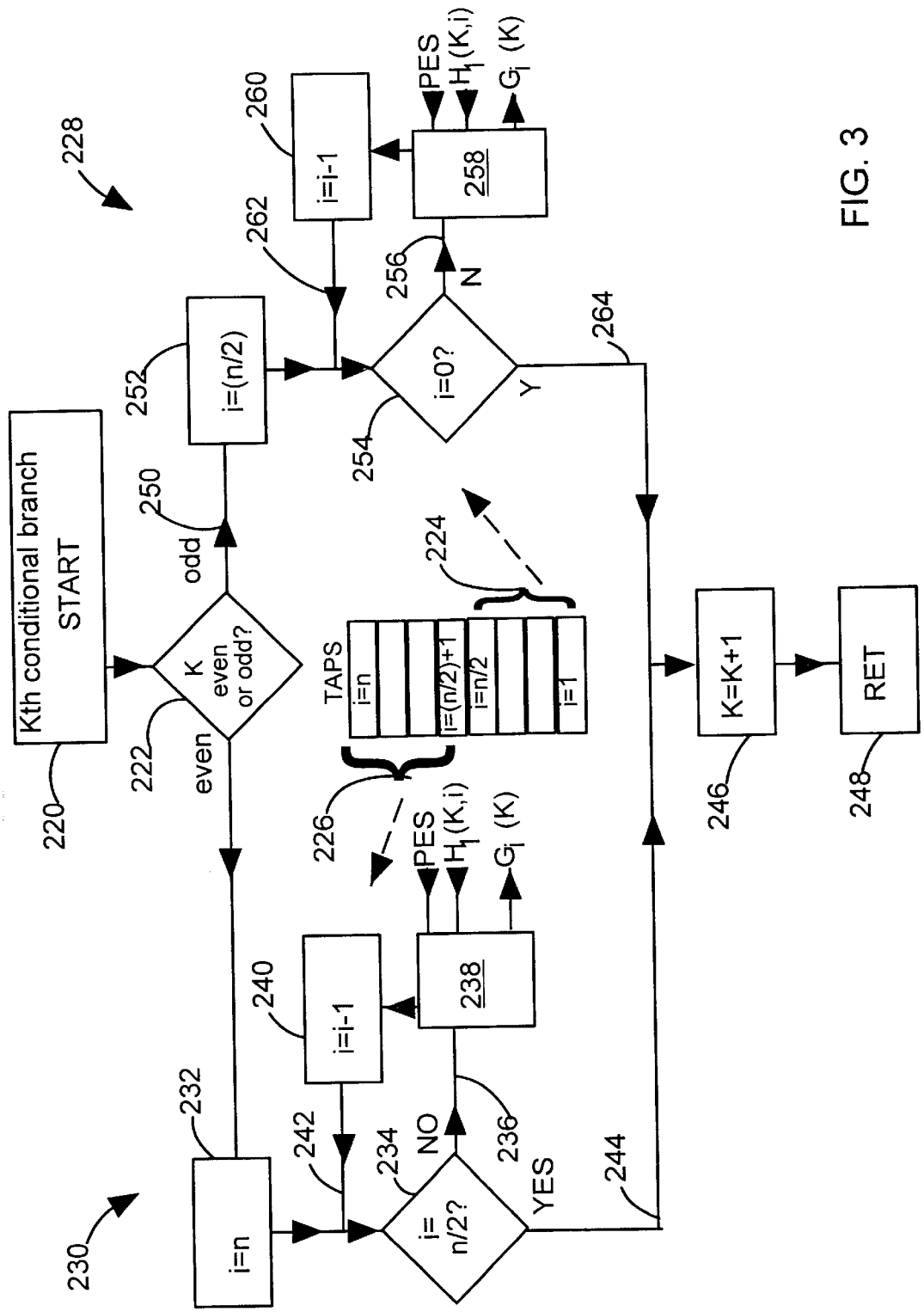
FIG. 3 illustrates a flow chart of performing rotational acceleration correction in a processor.

FIG. 3 illustrates a general flow chart performing rotational acceleration correction in a disc drive. The process illustrated in FIG. 3 can perform the corrections such as those shown in Equation 1 for a disc drive such as those illustrated in FIGS. 1 or 2, for example. In FIG. 3, processing starts at start 220 when a conditional branch is executed. Conditional branches are assigned sequential numbers "K" so that different sets of controller gains can be selected for updating at decision point 222 depending on the number K of the conditional branch. In the example illustrated in FIG. 3, there are only two sets of controller gains, and sets are selected based on whether K is odd (not evenly divisible by 2) or even (evenly divisible by 2). It will be understood that there can be a larger number P of sets of controller gains that is larger than 2, in which case sets of controller gains can be sequentially selected for updating based on a counter which counts from 1 to P.

If the number K is found to be an odd number at decision point 222, then processing proceeds generally along the right side 228 of FIG. 3 to update the first set of controller gains or taps i=1 up to i=(n/2) illustrated schematically at 224. If the number K is found to be an even number at 222, then processing proceeds generally along the left side 230 of FIG. 3 to update the second set of controller gains or taps i=(n/2)+1 up to i=n as illustrated schematically at 226.

After the left side 230 has been selected at decision point 222, a counter "i" is initially set to "n" at process block 232. Next, the counter "i" is tested at decision point 234 to determine if it is counted down yet to "n/2". If the counter "i" has not been counted down that far yet, then the process proceeds along line 236 (marked NO) to process block 238. Process block 238 performs a calculation like that shown in Equation 1 with i=n on the first pass. The counter i is then decremented, i.e., i=i−1, at process block 240 and program flow returns along line 242 to decision point 234. The process continues to loop around the path 234-236-238-240-242-234 until the counter "i" is decremented to i=n/2. Then, program flow exits the loop at 244 and goes to process block 246. At process block 246, the conditional branch number K is incremented, K=K+1, and the program flow leaves gain updating to return to servo processing at process block 248. The next time there is an conditional branch to process block 220, the number K will be odd and processing will proceed from decision point 222 along line 250.

After the right side 228 has been selected at decision point 222, the counter "i" is initially set to "n/2" at process block 252. Next, the counter "i" is tested at decision point 254 to determine if it is counted down yet to "0". If the counter "i" has not been counted down that far yet, then the process proceeds along line 256 (marked N) to process block 258. Process block 258 performs a calculation like that shown in Equation 1 with i=n/2 on the first pass. The counter i is then decremented, i.e., i=i−1, at process block 260 and program flow returns along line 262 to decision point 254. The process continues to loop around the path 254-256-258-260-262-254 until the counter "i" is decremented to i=0. Then, program flow exits the loop at 264 and goes to process block 246. At process block 246, the conditional branch number K is incremented, K=K+1, and the program flow leaves gain updating to return to servo processing at process block 248.

Figure 4:
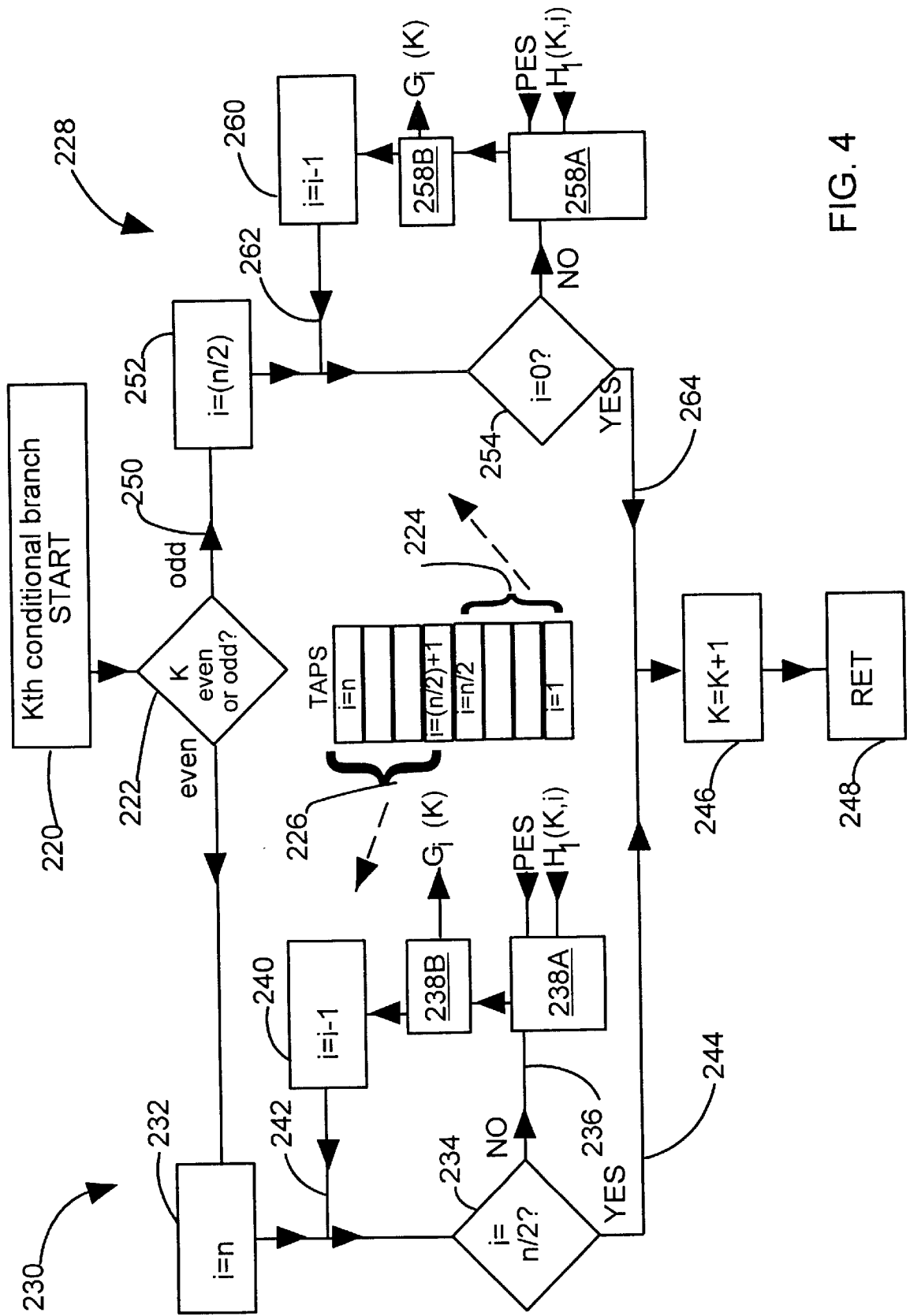
FIG. 4 illustrates a flow chart of performing rotational acceleration correction including a gain step limit in a processor.

FIG. 4 illustrates a general flow chart performing rotational acceleration correction in a disc drive. The process illustrated in FIG. 4 can perform the corrections such as those shown in Equation 2 for a disc drive such as those illustrated in FIGS. 1 or 2, for example. The process illustrated in FIG. 4 is similar to the process illustrated in FIG. 3. The reference numerals used in FIG. 4 that are the same as reference numerals used in FIG. 3 identify the same or similar processes. The process shown in FIG. 4 performs a calculation along the lines of Equation 2 in process blocks 238A, 238B and 258A, 258B, while the process illustrated in FIG. 3 performs calculations along the lines of Equation 1 in process blocks 238, 258. In FIG. 4, process blocks 238A, 258A perform all of the functions listed in Equation 2 except for the gain step limit. Process blocks 238B and 258B perform the function of gain_step_limit in Equation 2. The gain step limit limits the amount of change (g$_i$(k)−g$_i$(k−1)) in a gain tap to a predetermined limit. This arrangement helps prevent overcorrecting when there is a large rotational disturbance. In other respects, the processes illustrated in FIG. 4 are generally the same as those described above in connection with FIG. 3.

It will be understood by those skilled in the art that the steps illustrated in FIGS. 3 and 4 can be executed in software, hardware, or a combination of software and hardware.

FIG. 5 illustrates exemplary timing of gain corrections calculated within a computational time limit CTL=T1 and interleaved with servo calculations in a processor such as processor 170 described in connection with FIG. 2 or processor 140 described in connection with FIG. 1. FIG. 5 is a timing diagram that schematically illustrates timing relationships between interleaved slices of code that are executed in performing servo controller functions and gain update functions.

In FIG. 5, a first waveform 280 illustrates servo data that is received from the head, such as might be present, for example, on line 138 in FIG. 1 or line 180 in FIG. 2. A second waveform 282 illustrates a data ready interrupt that indicates that the servo data is ready for use. A third waveform 284 indicates time intervals during which code for a servo controller, such as servo controller 190 in FIG. 2 is executing. After each execution of code for the servo controller, there is an interval of time T1 when code for the servo controller is not executing, and there is computational time available for use. The length of the time interval T1 sets a computational time limit (CTL) which limits the amount of computation that can be interleaved between two successive executions of servo controller code. Updating all of the taps in the gains for rotational vibration correction takes an amount of time that exceeds the computational time limit (CTL). The gains are thus divided up into two sets 1 and 2. A fourth waveform 286 illustrates a time interval 288 during which the first set 1 of gains are updated and a time interval 290 during which the second set 2 of gains are updated.

The slices of processor time 288, 290 are interleaved with slices of processor time 284 that are used for servo controller computations. Time overruns beyond the computational time limit T1 can cause an interrupt for the next data wedge, and multisamp computation can be pushed out in time, and a significant error in servo performance results. In some disc drives, however, a shorter computational time limit may be required, and three or more sets of adjustable gains can be used to meet the shorter time limit.

In summary, a method and circuit are disclosed that correct for rotational vibration disturbances of a position (θ) of a head (110, 176) in a disc drive (100). A controller (130, 170) that controls a positioning motor (118, 174) for the head (110, 176) includes multiple sets (200, 202) of adjustable controller gains "g$_i$" for rotational vibration correction.

An accelerometer output (156, 188) indicating vibration is coupled to the controller (130, 170). The accelerometer output (156, 188) is compared to an acceleration threshold (at 198) stored in the controller (130, 170). The controller (130, 170) generates conditional branching (220) as a function of the comparison.

The controller (130, 170) updates one set (200) of the adjustable controller gains "g$_i$" within a computational time limit (T1) after a first conditional branch (220). The controller (130, 170) preferably updates a second set (202) of the adjustable controller gains "gi" within the computational time limit (T1) after a second conditional branch (220).

It is to be understood that even though numerous characteristics and advantages of various embodiments of the present invention have been set forth in the foregoing description, together with details of the structure and function of various embodiments of the invention, this disclosure is illustrative only, and changes may be made in detail, especially in matters of structure and arrangement of parts within the principles of the present invention to the full extent indicated by the broad general meaning of the terms in which the appended claims are expressed. The examples of algorithms illustrated can be modified for various applications within the scope of the invention. Although the preferred embodiments described herein are directed to disc drives, it will be appreciated by those skilled in the art that the teachings of the present invention can be applied to other systems where accelerometers are used, without departing from the scope and spirit of the present invention.

What is claimed is:

1. A method of correcting for vibration disturbances of a head position in a disc drive, comprising:
    (a) controlling a positioning motor for the head with a controller having multiple sets of adjustable controller gains "g$_i$";
    (b) coupling an accelerometer output indicating vibration of the disc drive to the controller;
    (c) comparing the accelerometer output to an acceleration threshold stored in the controller;

(d) branching conditionally in the controller as a function of the comparing; and (e) updating one set of the adjustable controller gains "$g_i$" within a computational time limit after a first conditional branching.

2. The method of claim 1, further comprising:

(f) updating a second set of the adjustable controller gains "$g_i$" within a computational time limit after a second conditional branching.

3. The method of claim 1 further comprising:

(f) storing a preset gain step limit in the controller and limiting an adjustable controller gain change "$g_i-g_{i-1}$" by the preset gain step limit.

4. The method of claim 1, further comprising:

(f) generating a position error signal (PES) as a function of a position set point and a sensed head position; and (g) further conditioning the generating of the successive conditional branching upon the PES exceeding a PES threshold stored in the controller.

5. The method of claim 4 further comprising:

(h) updating the adjustable controller gains "$g_i$" based on amplitude and phase relationships between the accelerometer output and the PES.

6. The method of claim 4 further comprising:

(h) updating the adjustable controller gains "$g_i$" substantially according to the formula:

$$g_i(k)=g_i(k-1)+\text{const}*PES(k)*H_1(k,i)$$

where k is a sequence number of the conditional branching, "const" is a constant and $H_1$ is the acceleration output passed through a model representing characteristics of the positioning motor.

7. The method of claim 4, further comprising:

(h) updating the adjustable controller gain "$g_i$" substantially according to the formula:

$$g_i(k)=g_i(k-1)+F\{\text{const}*PES(k)*H_1(k,i),\text{ gain\_step\_limit}\}$$

where k is a sequence number of the conditional branching, const is a constant, $H_1$ is the acceleration output passed through a model representing characteristics of the positioning motor and gain_step_limit is a gain step limit stored in the controller.

8. A disc drive, comprising:

a servo system including a servo controller having multiple sets of adjustable controller gains "$g_i$", a head, and a motor coupled to the servo controller and the head;

a rotational vibration correction circuit adapted to receive an accelerometer output and the rotational vibration correction circuit providing successive conditional branchings as a function of a comparison of the accelerometer output and an acceleration threshold; and an update circuit providing an update of one of the multiple sets of the adjustable controller gains "$g_i$" within a computational time limit after each successive conditional branching.

9. The disc drive of claim 8 wherein the update circuit provides an update of a second set of the adjustable controller gains "$g_i$" within a computational time limit after a second conditional branching.

10. The disc drive of claim 8 wherein the update circuit includes a preset gain step limit provides a controller gain change "$g_i-g_{i-1}$" that is limited by the preset gain step limit.

11. The disc drive of claim 8, wherein the servo system includes a summing junction that is couplable to a position set point and a sensed head position, the summing junction coupling a position error signal (PES) to the comparator circuit.

12. The disc drive of claim 11 wherein the update circuit updates the adjustable controller gains "$g_i$" based on amplitude and phase relationships between the accelerometer output and the PES.

13. The disc drive of claim 11 wherein the update circuit updates the adjustable controller gains "$g_i$" substantially according to the formula:

$$g_i(k)=g_i(k-1)+\text{const}*PES(k)*H_1(k,i)$$

where k is a sequence number of the conditional branching, "const" is a constant and $H_1$ is the acceleration output passed through a model representing characteristics of the positioning motor.

14. The disc drive of claim 11 wherein the update circuit updates the adjustable controller gain "$g_i$" substantially according to the formula:

$$g_i(k)=g_i(k-1)+F\{\text{const}*PES(k)*H1(k,i),\text{ gain}_{13}\text{ step\_limit}\}$$

where k is a sequence number of the conditional branching, const is a constant, $H_1$ is the acceleration output passed through a model representing characteristics of the positioning motor and gain_step_limit is a gain step limit stored in the controller.

15. A disc drive, comprising:

means for servo-controlling a head position as a function of multiple sets of adjustable controller gains "$g_i$"; and means for comparing an accelerometer output to a stored acceleration threshold, and for providing an update of one of the multiple sets of the adjustable controller gains "$g_i$" within a computational time limit after a first conditional branching.

16. The disc drive of claim 15, further comprising:

means for updating a second set of the adjustable controller gains "$g_i$" within a computational time limit after a second conditional branching.

* * * * *

UNITED STATES PATENT AND TRADEMARK OFFICE
CERTIFICATE OF CORRECTION

PATENT NO. : 6,414,813 B2
DATED : July 2, 2002
INVENTOR(S) : Cvancara

It is certified that error appears in the above-identified patent and that said Letters Patent is hereby corrected as shown below:

<u>Column 6,</u>
Equation 2 should read -- $g_i(k) = g_i(k-1) + F\{const * PES(k) * H_1(k,i), gain\_step\_limit\}$ --

<u>Column 10,</u>
Claim 14 should read -- $g_i(k) = g_i(k-1) + F\{const * PES(k) * H_1(k,i), gain\_step\_limit\}$ --

Signed and Sealed this

Twenty-fourth Day of December, 2002

JAMES E. ROGAN
*Director of the United States Patent and Trademark Office*